(12) United States Patent
Wen

(10) Patent No.: US 8,104,146 B2
(45) Date of Patent: Jan. 31, 2012

(54) SAFETY CORD RELEASE OF WINDOW COVERING

(75) Inventor: Yu-Che Wen, Taoyuan County (TW)

(73) Assignee: Nien Made Enterprise Co. Ltd., Taichung (TW)

( * ) Notice: Subject to any disclaimer, the term of this patent is extended or adjusted under 35 U.S.C. 154(b) by 0 days.

(21) Appl. No.: 12/830,208

(22) Filed: Jul. 2, 2010

(65) Prior Publication Data

US 2012/0000036 A1   Jan. 5, 2012

(51) Int. Cl.
*F16G 11/00* (2006.01)

(52) U.S. Cl. ............... 24/115 F; 24/115 R; 160/178.1 R; 160/178.2

(58) Field of Classification Search ............ 24/115 F, 24/115 H, 115 R, 129 R; 160/178.1 R, 178.2
See application file for complete search history.

(56) References Cited

U.S. PATENT DOCUMENTS

| | | | | |
|---|---|---|---|---|
| 1,993,173 A * | 3/1935 | Kuyper | ............... | 160/168.1 R |
| 2,877,527 A * | 3/1959 | Bond | ............... | 403/206 |
| 4,049,357 A * | 9/1977 | Hamisch, Jr. | ............... | 403/209 |
| 4,771,516 A * | 9/1988 | Foth | ............... | 24/115 R |
| 4,909,298 A * | 3/1990 | Langhart et al. | ............... | 160/178.1 R |
| 5,208,950 A * | 5/1993 | Merritt | ............... | 24/115 H |
| 5,473,797 A * | 12/1995 | Wu | ............... | 24/115 H |
| 5,518,056 A * | 5/1996 | Voss | ............... | 160/178.1 R |
| 5,560,414 A * | 10/1996 | Judkins et al. | ............... | 160/178.1 R |
| 5,562,140 A * | 10/1996 | Biba | ............... | 160/178.1 R |
| 5,825,289 A * | 10/1998 | Riordan | ............... | 340/550 |
| 5,906,233 A * | 5/1999 | May | ............... | 160/178.1 R |
| 5,908,063 A * | 6/1999 | Gobidas | ............... | 160/178.1 R |
| 5,971,054 A * | 10/1999 | Gobidas | ............... | 160/178.1 R |
| 6,044,527 A * | 4/2000 | Ishida et al. | ............... | 24/129 R |
| 6,618,910 B1 * | 9/2003 | Pontaoe | ............... | 24/115 H |
| 6,935,399 B2 * | 8/2005 | Nien | ............... | 160/168.1 R |
| 7,094,251 B2 * | 8/2006 | Bonutti et al. | ............... | 606/232 |
| 7,299,851 B2 * | 11/2007 | Dekker | ............... | 160/178.1 R |
| 7,331,371 B1 * | 2/2008 | Kovach et al. | ............... | 160/178.1 R |
| 7,383,871 B2 * | 6/2008 | Osinga | ............... | 160/178.1 R |
| 7,587,794 B2 * | 9/2009 | Lin | ............... | 24/115 F |
| 2005/0056385 A1 * | 3/2005 | Dekker | ............... | 160/178.1 R |
| 2006/0011310 A1 * | 1/2006 | Chou | ............... | 160/178.1 R |
| 2008/0196213 A1 * | 8/2008 | Lin | ............... | 24/115 F |
| 2009/0241295 A1 * | 10/2009 | Zhang | ............... | 24/115 F |

* cited by examiner

*Primary Examiner* — Robert Sandy
*Assistant Examiner* — Tyler Johnson
(74) *Attorney, Agent, or Firm* — Apex Juris, pllc; Tracy M. Heims

(57) ABSTRACT

A safety cord release for a window covering has a top section, a middle section, and a bottom section from a top to a bottom thereof. The safety cord release has a right case and a left case combined with the right case. There are several pairs of couplers on the right case and the left case located at the top section, the middle section and the bottom section respectively for engagement to reduce a transverse force from cords and to separate the right case and the left case immediately to release the cords for safety.

10 Claims, 7 Drawing Sheets

SAFETY CORD RELEASE OF WINDOW COVERING

BACKGROUND OF THE INVENTION

1. Field of the Invention

The present invention relates generally to a window covering, and more particularly to a safety cord release of a window covering.

2. Description of the Related Art

Typically, a cord-operated window covering is equipped with two or more cords to balance the force to fold and unfold a window covering blanket or slats thereof. Take a window covering with two cords for example, free ends of the cords are coupled by a cord release, and the cord release is connected with another operating cord for manipulation. FIG. 1 shows a conventional cord release 1, which has two symmetrical cases 2 and 3 with their bottom ends connected to each other. The case 2 has two hooks 2a, and the case 3 has two openings 3a to be engaged with the hooks 2a that the cases 2 and 3 are combined to couple the cords. However, the cases 2 and 3 are opened only when one exerts a great force to disengage the hooks 2a and the openings 3a. It may cause danger for children who play the cords and children might be strangulated by the cords before disengagement and open of the cord release.

FIG. 2 shows another conventional cord release 5 which includes three cases 6 combined together by flexible hooks 6a and slots 6b. Each case 6 has the hook 6a and the slot 6b on opposite side to be engaged with the corresponding slots 6b and hooks 6a of the neighboring cases 6.

When a child is strangulated by the cords and struggles to get away, the cords will be pulled outwards respectively to disengage the hooks 6a from the slots 6b that the cases 6 are opened to release the cords, and the child may get away from the cords.

The hooks 6a and the slots 6b are adjacent to tops of the cases 6 and they are at the same level that the hooks 6a and the slots 6b need to be disengaged at the same time in order to open the cord release 5. For instance, suppose a predetermined force is needed to disengage a pair of the hook 6a from the slot 6b, it needs 3 times the strength of the force to open the three cases 6. Furthermore, the cord release 5 may not be totally opened when an unbalanced force is exerted to the cords that only one case 6 is disengaged and the rest two are still engaged together. In this condition, the cords may not be released that they may still cause danger. In other word, the conventional cord releases still need to be improved.

SUMMARY OF THE INVENTION

The primary objective of the present invention is to provide a safety cord release of a window covering, which may release the cord by a low transverse force.

According to the objective of the present invention, a safety cord release for a window covering includes a right case and a left case. The right case has an edge, a recess to receive the cords therein, and at least a cord fastener projected from a sidewall of the recess to fasten cords. The right case has a first coupling portion on the edge of a top section and at least a second coupling portion on the edge of a middle section. The left case has an edge, a recess to receive the cords therein, and at least a cord fastener projected from a sidewall of the recess to fasten the cords. The left case has a first connecting portion on the edge of the top section and at least a second connecting portion on the edge of the middle section.

The first coupling portion of the right case is engaged with the first connecting portion of the left case, and the second coupling portion of the right case is engaged with the second connecting portion of the left case when the right case is combined with the left case.

DETAILED DESCRIPTION OF THE INVENTION

Figure 7:
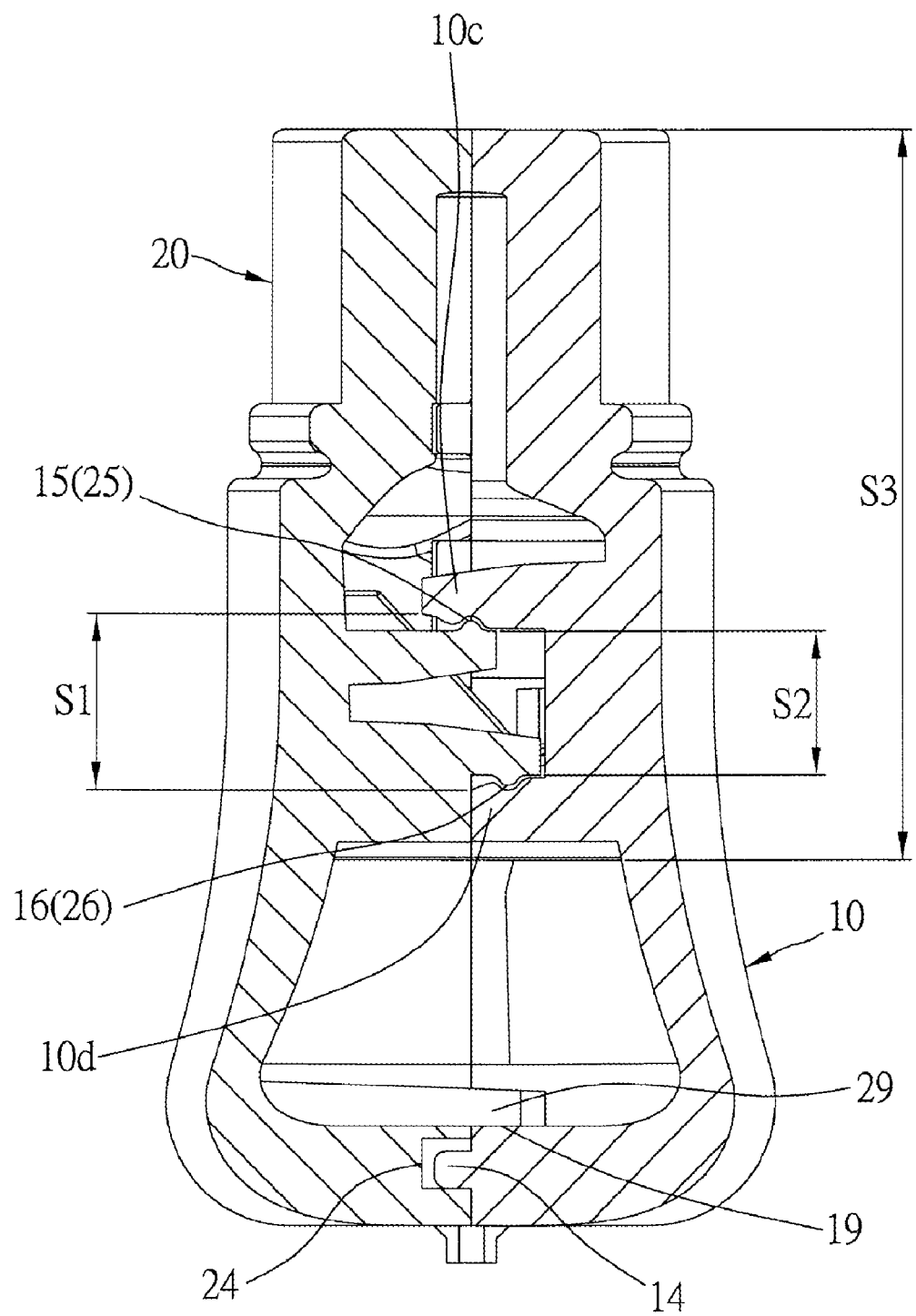
FIG. 7 is a sectional view along the 7-7 line of FIG. 6.

A safety cord release 100 of the preferred embodiment of the present invention includes a right case 10 and a symmetrical left case 20 connected together to form a barrel with a top opening 100A and a bottom opening 100B. Two connecting pieces 30 connect bottoms of the right case 10 and the left case 20. Cords 101 may be inserted into the safety cord release 100 via the top opening 100A, and an operating cord 102 may be inserted into the safety cord release 100 via the bottom opening 100B. The left case 20 has a plate 29 at the bottom thereof, and the bottom opening 100B is provided through the plate 29. The plate 29 touches and sits on an inner side 19 of the bottom of the right case 10 when the cord release is in the closed position, as shown in FIG. 7.

The right case 10 and the left case 20 each has an edge 10a(20a) with a recess 10b(20b) thereon, and a top cord fastener 10c(20c) and a bottom cord fastener 10d(20d) projected from an inner sidewall of the recess 10b(20b). As shown in FIG. 7, there are a first distance S1 between the top cord fastener 10c and the bottom cord fastener 10d of the right case 10, and a second distance S2 between the top cord fastener 20c and the bottom cord fastener 20d of the left case 20. The first distance S1 is greater than the second distance S2. The recesses 10b and 20b provide a space to receive the cords 101 therein. The couplers are to fasten the cords 101 by knotting the cords 101 (not shown). The safety cord release 100 of the present invention has a top section 100a, a middle section 100b, and a bottom section 100c from the top to the bottom.

When the operating cord 102 is pulled downward using a regular force, it will press the plate 29 of the left case 10 on the inner side 19 of the first case 10 and transmit the force to the right case 10 to balance the force on the right case 10 and the left case 20 such that a window covering blanket or slats (not shown) may be folded and unfolded through the cords 101. When the cords 101 are pulled outward horizontally by transverse forces, the transverse forces may separate the right case 10 and the left case 20 to prevent children from being strangulated by the cords 101. The detail of how the right case 10 and the left case 20 separate is described hereunder.

Figure 1:
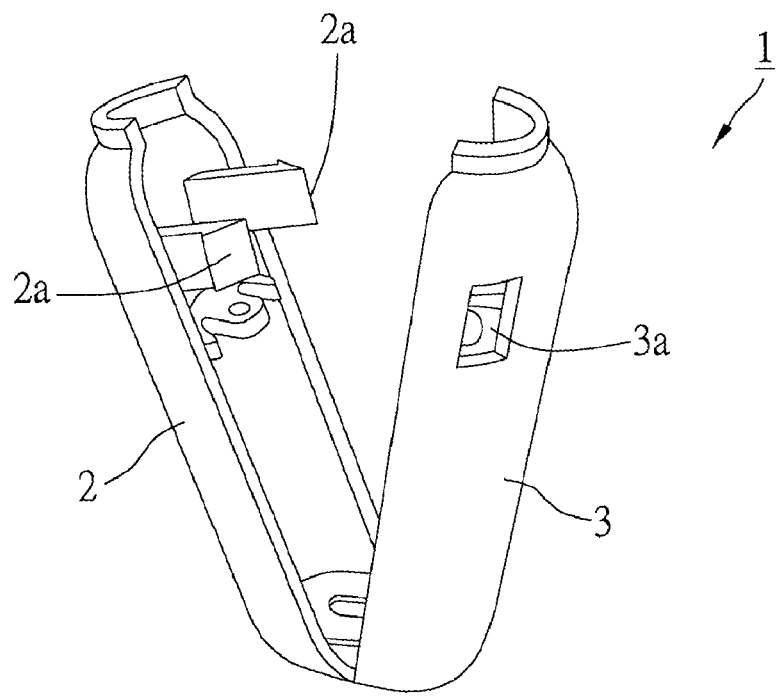
FIG. 1 is a perspective view of the first conventional cord release.
Figure 2:
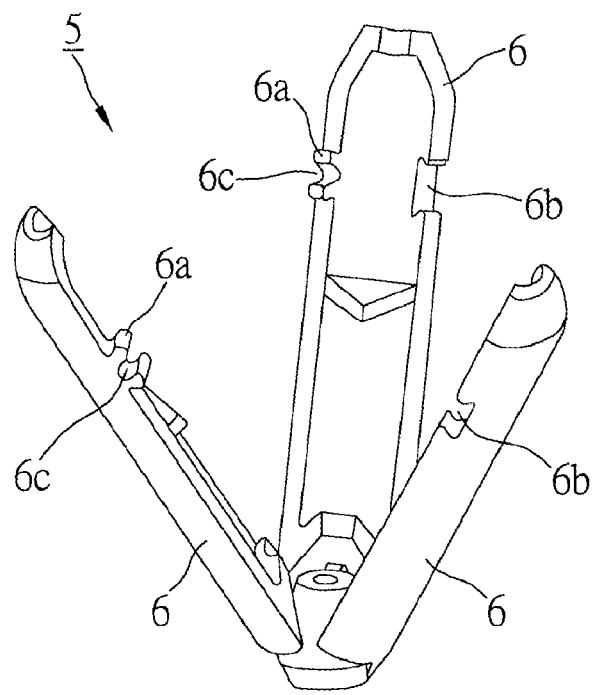
FIG. 2 is a perspective view of the second conventional cord release.
Figure 3:
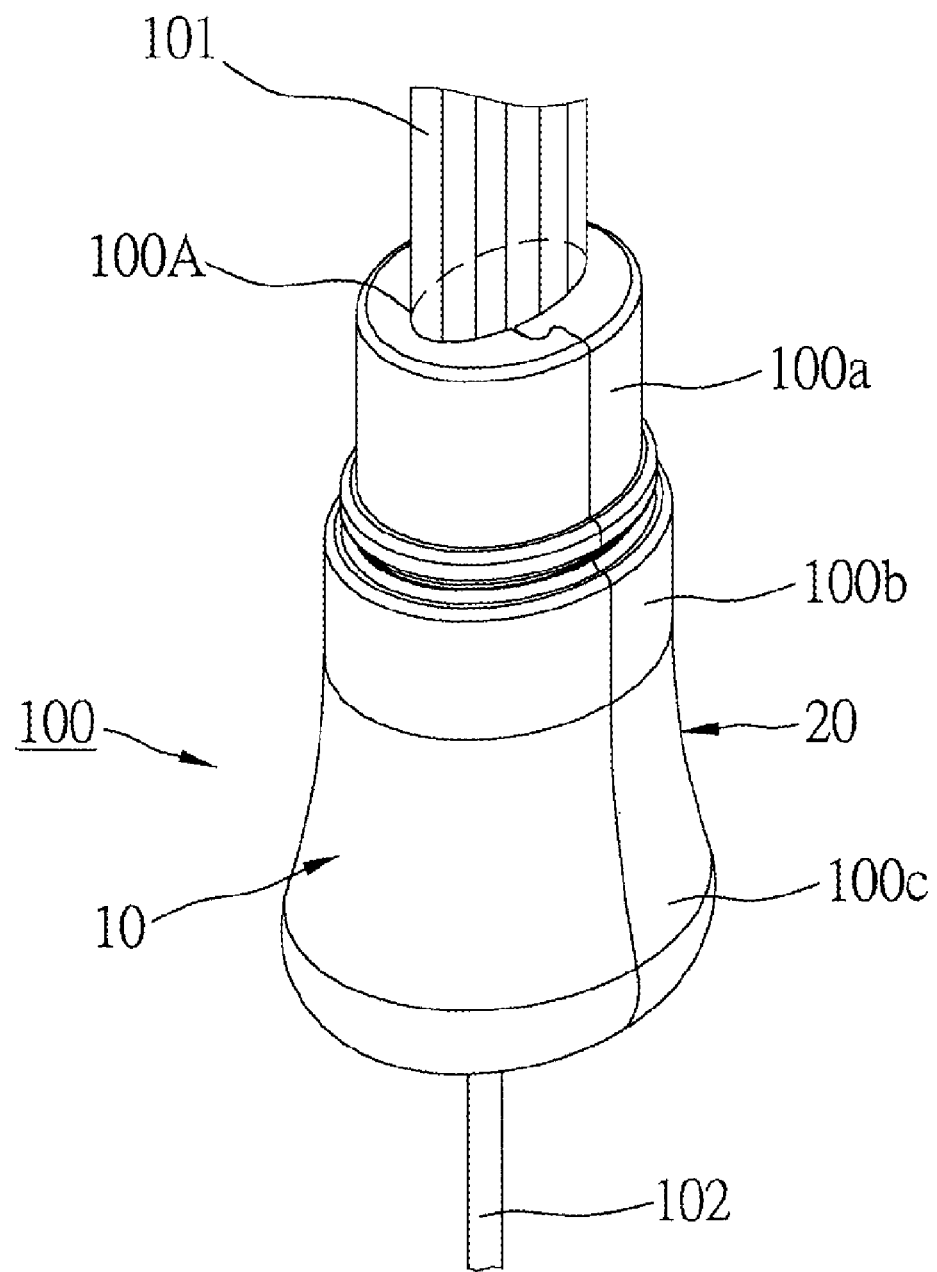
FIG. 3 is a perspective view of a preferred embodiment of the present invention in the closed condition.
Figure 4:
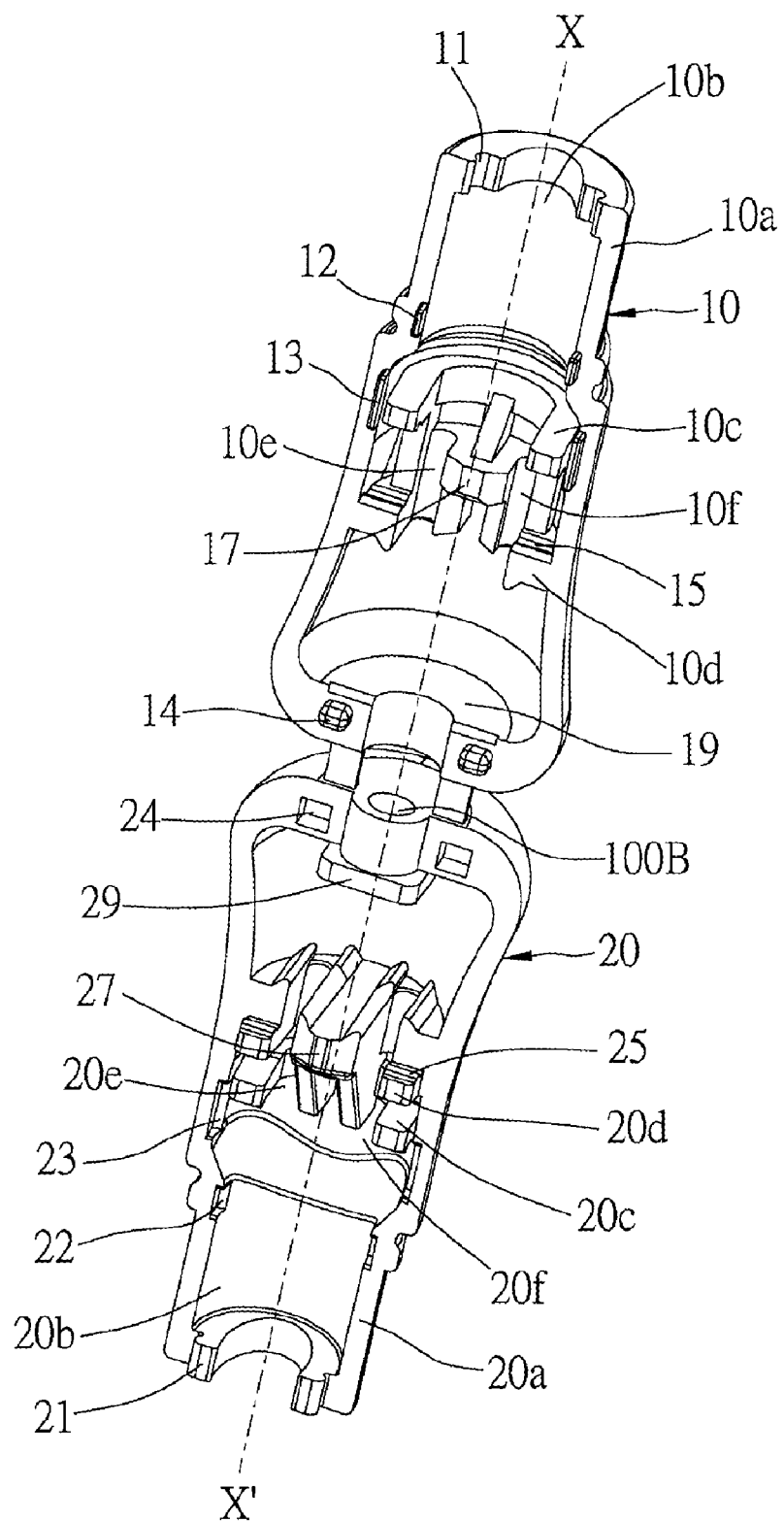
FIG. 4 is a perspective view of the preferred embodiment of the present invention in the opened condition.
Figure 5:
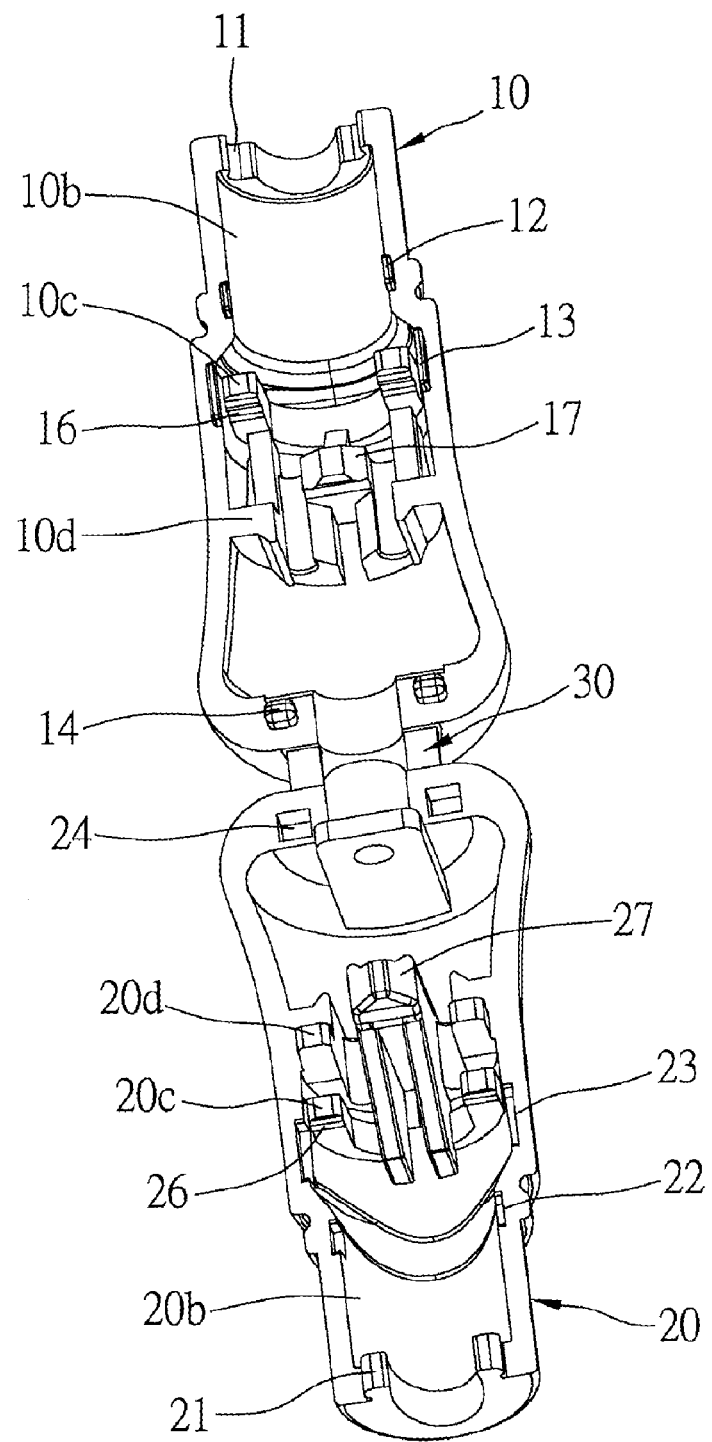
FIG. 5 is another view of FIG. 4.

As shown in FIG. 4, a main axis X-X' passes through the right case 10 and the left case 20 to divide them into two symmetrical parts, named a right part and a left part. We only describe the right part hereunder, and the left part is symmetric to the right part.

Figure 6:
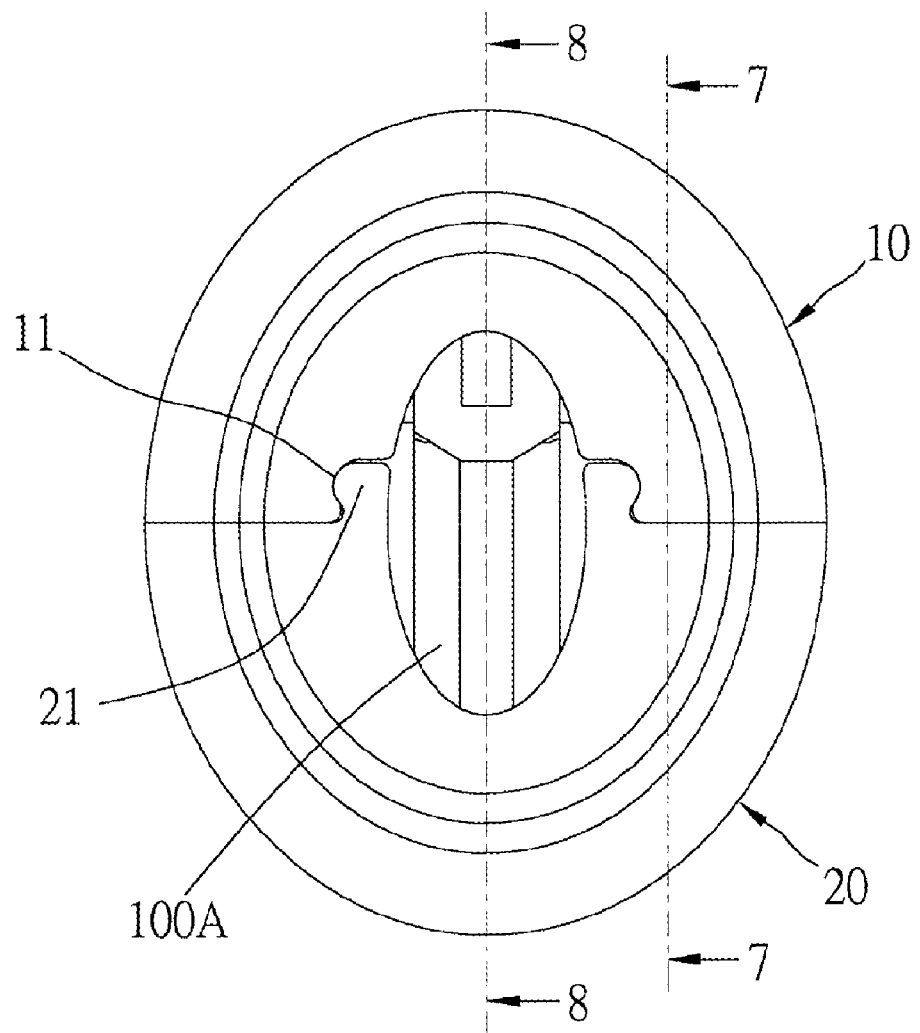
FIG. 6 is a top view of the preferred embodiment of the present invention in the opened condition.

The right case 10 has a first coupling portion on the edge 10a at the top section 100a, and the left case 20 has a first connecting portion on the edge 20a at the top section 100a also. In the present invention, the first coupling portion of the right case 10 has a curved slot 11 at a junction of the edge 10a and the sidewall of the recess 10b. The first connecting portion of the left case 20 has a protrusion 21 at a junction of the edge 20a and the sidewall of the recess 20b, and the protrusion 21 have a hook at a distal end thereof. The protrusion 21 is engaged with the slot 12 when the right case 10 and left case 20 are combined, as shown in FIG. 6, and they are referred as a first pair of couplers.

The right case 10 has a second coupling portion and a third coupling portion on the edge 10a at the middle section 100a. In the present invention, the second coupling portion and the third coupling portion each has a protrusion 12(13) at a junction of the edge 10a and the sidewall of the recess 10b. There is a distance between the protrusion 12 and the protrusion 13. The left case 20 has a second connecting portion and a third connecting portion on the edge 20a at the middle section 100a in associated with the second and third coupling portions of the right case 10. In the present invention, the second and third connecting portions of the left case 20 each has a slot 22(23) at a junction of the edge 10a and the sidewall of the recess 10b. The protrusions 12, 13 are engaged with the slots 22, 23 respectively when the right case 10 and left case 20 are in the closed position. The protrusion 12 and the slot 22 are referred as a second pair of couplers, and the second protrusion 13 and the second slot 23 are referred as a third pair of couplers.

The right case 10 has a fourth coupling portion, which is a protrusion 14 on the edge 10a at the bottom section 100c, and the left case 20 has a fourth connecting portion, which is a slot 24 on the edge 20a in association with the protrusion 14 for engagement when the right case 10 and left case 20 are in the closed position, and they are referred as a fourth pair of couplers.

Above couplers are provided on the edges of the cases. There still are other couplers to be described hereunder.

As shown in FIG. 4, the right case 10 is provided with a fifth coupling portion, which is a slot 15, at a top side of the bottom cord fastener 10d, and the left case 20 is provided with a fifth connecting portion, which is a protrusion 25, at a bottom side of the bottom cord fastener 20d. As shown in FIG. 4, the right case 10 is provided with a sixth coupling portion, which is a slot 16, on a bottom side of the top cord fastener 10c, and the left case 20 is provided with a sixth connecting portion, which is a protrusion 26, at a top side of the top cord fastener 20c. As shown in FIG. 7, because the first distance S1 between the top and bottom cord fasteners 10c, 10d of the right case 10 is greater than the second distance S2 between the top and bottom cord fasteners 20c, 20d of the left case 20, the slot 15 is engaged with the protrusion 25 and the slot 16 is engaged with the protrusion 26 when the right case 10 and left case 20 are in the closed position. The slot 15 and the protrusion 25 are referred as a fifth pair of couplers, and the slot 16 and the protrusion 26 are referred as a sixth pair of couplers.

Figure 8:
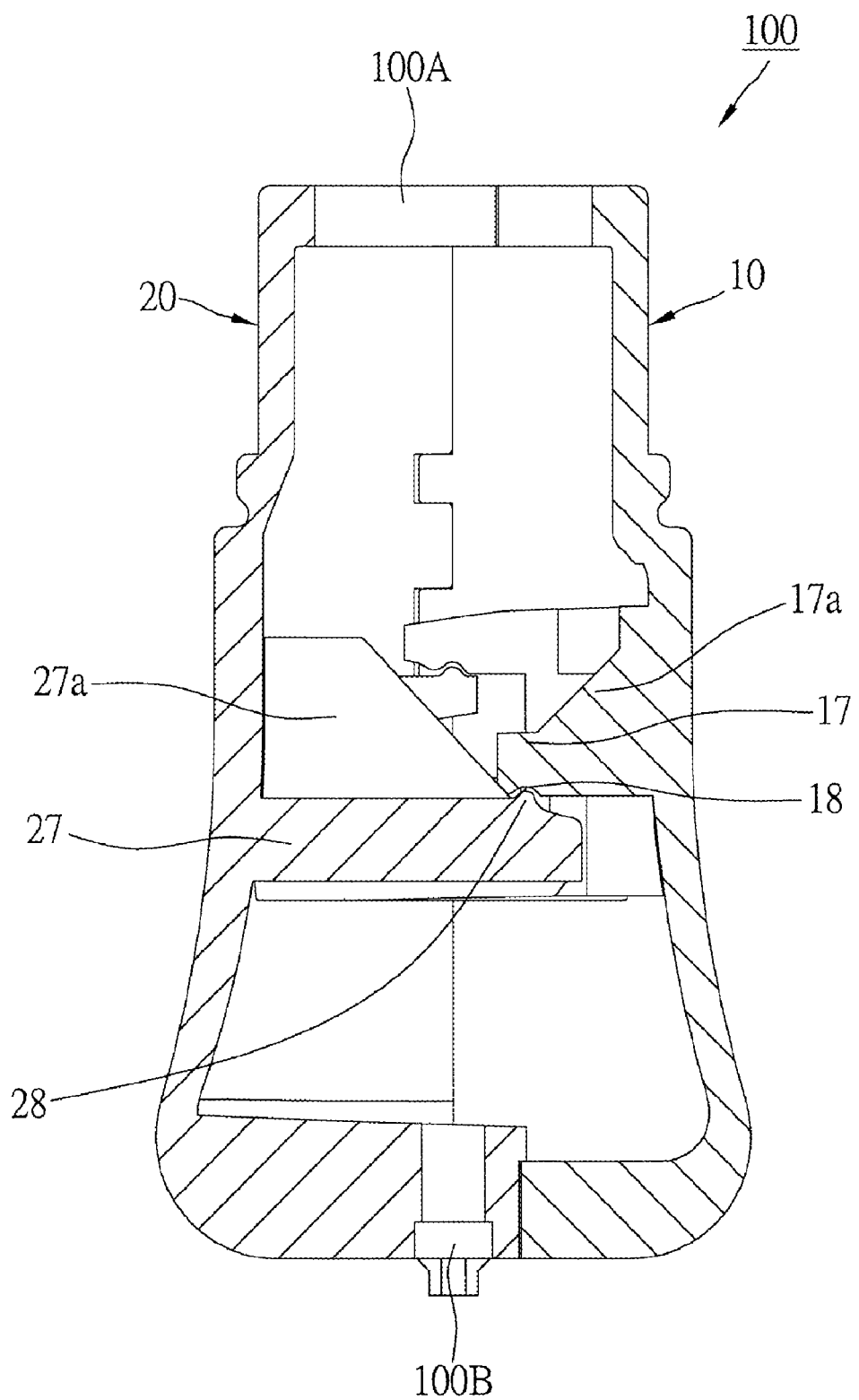
FIG. 8 is a sectional view along the 8-8 line of FIG. 6.

As shown in FIG. 4 and FIG. 8, the right case 10 has a right protrusion 17 and a rib 17a on the right protrusion 17, which are projected from the sidewall of the recess 10b, at the middle section 100b. It forms a left cord slot 10e and a right cord slot 10f between the right protrusion 17 and the top and bottom cord fasteners 10c, 10d respectively to receive the cords 101. The right case 10 has a seventh coupling portion, which is a slot 18, located at a front bottom end of the right protrusion 17. The left case 20 has a left protrusion 27 and two ribs 27 on the left protrusion 27, which are projected from the sidewall of the recess 20b. It forms a left cord slot 20e and a right cord slot 20f between the left protrusion 27 and the top and bottom cord fasteners 20c, 20d respectively to receive the cords 101. The left case 20 has a seventh connecting portion, which is a protrusion 28, located at a front up end of the right protrusion 17 to be engaged with the slot 18 of the right case 10 when the right case 10 and left case 20 are in the closed position. The slot 18 and the protrusion 28 are referred as a seventh pair of couplers.

The left cord slots 10e, 20e and the right cord slots 10f, 20f may each receive a plurality of cords 101 to separate the cords 101 in the safety cord release 100 and to prevent the cords from be tangled. Knots of the cords 101 may rest on bottom sides of the right and left protrusion 27. Widths of the cord slots, which are identical to distances between the protrusions and the cord fasteners, are smaller than the knots of the cords. It would help the tangled cords 101 in the cord slots to be back to order when the cords are pulled by the transverse force.

In conclusion, the present invention provides seven pairs of couplers to connect the right case 10 and the left case 20, and these couplers are separated in top, middle and bottom sections 100a, 100b, 100c of the safety cord release 100. The present invention also provides the function of fastening the cords 101 to the right and left protrusions 17, 27 at the middle section 100b. Preferably, a distance between the bottom sides of the right and left protrusions 17, 27 and the top side of the safety cord release 100 is greater than 50% of a distance between the top side and the bottom side of the safety cord release 100. The top opening 100A of the safety cord release 100 is elliptical, as shown in FIG. 7, which has a long axis substantially parallel to the edges 10a, 20a, that when a child has his/her head between the cords to exert the cords 101 with the transverse force, the safety cord release 100 will be forced to have the cords 101 moving to opposite ends of the long axis of the elliptical top opening 100A that the transverse force will force the right case 10 and the left case 20 tending to move away from each other, preventing cords 101 to be pinched at the gaps of edges 10a and 20a. When the transverse force disengages the slot 11 and the protrusion 21 (the first pair of coupler), the top of the right case 10 and the left case 20 will be separated. When the transverse force is continuously exerted, the second pair, third pair, and the fifth pair to the seventh pair of couplers will be disengaged in sequence to release the cords 100 from the safety cord release 100. The value of the transverse force to open the safety cord release 100 of the present invention is not a sum of the forces to disengage the first to seven pairs of couplers because these couplers are disengaged in sequence. The transverse force only needs to disengage the first pair of couplers, it may open the safety cord release 100 of the present invention to prevent the strangulation of kids.

The cords 101 is fastened at the middle section 100b of the safety cord release 100 of the present invention that the cords 101 may produce a great torque to open the right case 10 and the left case 20. For the same principle, it is more effective when the cords 101 are fastened closer to the bottom section 100c.

The description above is a few preferred embodiments of the present invention and the equivalence of the present invention is still in the scope of claim construction of the present invention.

What is claimed is:
1. A safety cord release for a window covering, which is connected to a plurality of cords and an operating cord, and has a top section, a middle section and a bottom section from a top to a bottom, comprising:
- a right case and a left case combined together to form the safety cord release with a top opening for the cords to pass through and a bottom opening for the operating cord to pass through;
- the right case having an edge, a recess to receive the cords therein, and at least a cord fastener projected from a sidewall of the recess to fasten the cords;
- the left case having an edge, a recess to receive the cords therein, and at least a cord fastener projected from a sidewall of the recess to fasten the cords;
- the right case having a series of sequentially arranged coupling portions that includes a coupling portion on the edge of the top section and at least a coupling portion on the edge of the middle section;
- the left case having a series of sequentially arranged connecting portions that includes a connecting portion on the edge of the top section and at least a connecting portion on the edge of the middle section;
- wherein the coupling portions on the top section and the middle section of the right case engage the connecting portions on the top section and the middle section of the left case respectively when the right case is combined with the left case;
- the cord fastener of the right case including a top cord fastener, on a bottom side of which a coupling portion is provided, and a bottom cord fastener, on a bottom side of which a coupling portion is provided; and
- the cord fastener of the left case including a top cord fastener, on a top side of which a connecting portion is provided, and a bottom cord fastener, on a top side of which a connecting portion is provided;
- wherein the coupling portions on the top cord fastener and the bottom cord fastener of the right case engage the connecting portions on the top cord fastener and the bottom cord fastener of the right case respectively when the right case is combined with the left case.

2. The safety cord release as defined in claim 1, wherein the coupling portion on the top section of the right case has a slot at a junction of the edge and the sidewall of the recess, and the connecting portion on the top section of the left case has a protrusion at a junction of the edge and the sidewall of the recess.

3. The safety cord release as defined in claim 1, wherein the coupling portion on the middle section of the right case has a protrusion at a junction of the edge and the sidewall of the recess, and the connecting portion on the middle section of the left case has a slot at a junction of the edge and the sidewall of the recess.

4. The safety cord release as defined in claim 1, wherein the coupling portion on the middle section of the right case has a first protrusion and a second protrusion at a junction of the edge and the sidewall of the recess, and the connecting portion on the middle section of the left case has a first slot and a second slot at a junction of the edge and the sidewall of the recess.

5. The safety cord release as defined in claim 1, wherein the right case further includes a coupling portion on the edge of the bottom section, and the left case further includes a connecting portion on the edge of the bottom section to be engaged with the coupling portion on the bottom section of the right case when the right case and the left case are combined.

6. The safety cord release as defined in claim 1, wherein a first distance between the top cord fastener and the bottom cord fastener of the right case is greater than a second distance between the top cord fastener and the bottom cord fastener of the left case.

7. The safety cord release as defined in claim 1, wherein the right case further includes a right protrusion, which is projected from the sidewall of the recess, at the middle section to form a left cord slot and a right cord slot between the right protrusion and the cord fastener for receiving the cords, and the left case further includes a left protrusion, which is projected from the sidewall of the recess, at the middle section to form a left cord slot and a right cord slot between the left protrusion and the cord fastener for receiving the cords.

8. The safety cord release as defined in claim 7, wherein the right case has a slot on the right protrusion, and the left case has a protrusion on the left protrusion to be engaged with the slot of the right case when the right case and the left case are combined.

9. The safety cord release as defined in claim 7, wherein a distance between a bottom side of the right protrusion and a top side of the right case is greater than 50% of a distance between the top side and a bottom side of the right case.

10. The safety cord release as defined in claim 7, wherein a distance between a bottom side of the left protrusion and a top side of the left case is greater than 50% of a distance between the top side and a bottom side of the left case.

* * * * *